Aug. 31, 1937.   B. G. CARLSON   2,091,306
LEVEL FLIGHT CONTROL FOR AUTOMATIC PILOTS
Original Filed June 12, 1936   3 Sheets-Sheet 1

INVENTOR
Bert G. Carlson
BY
Herbert H. Thompson
HIS ATTORNEY.

Aug. 31, 1937.　　　　B. G. CARLSON　　　　2,091,306
LEVEL FLIGHT CONTROL FOR AUTOMATIC PILOTS
Original Filed June 12, 1936　　3 Sheets-Sheet 2
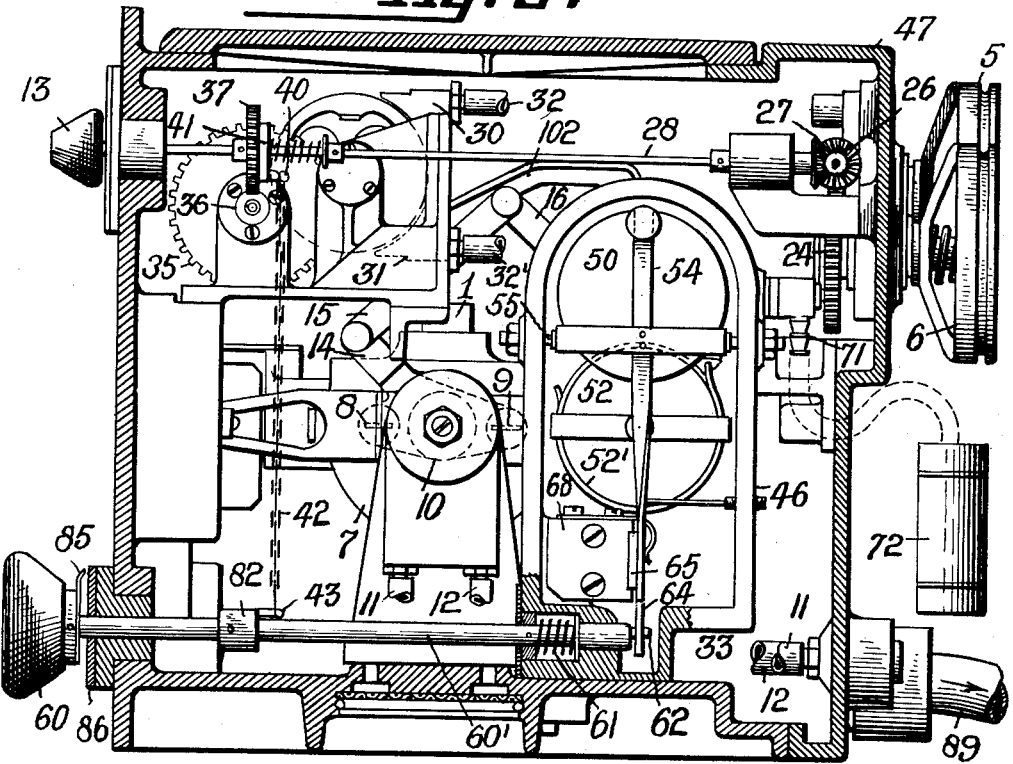
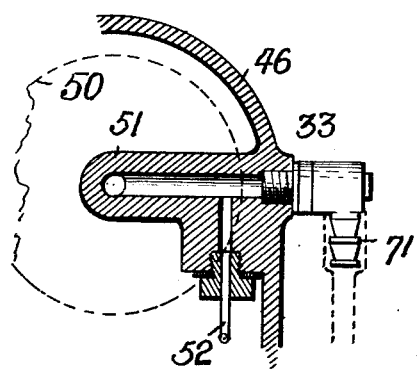
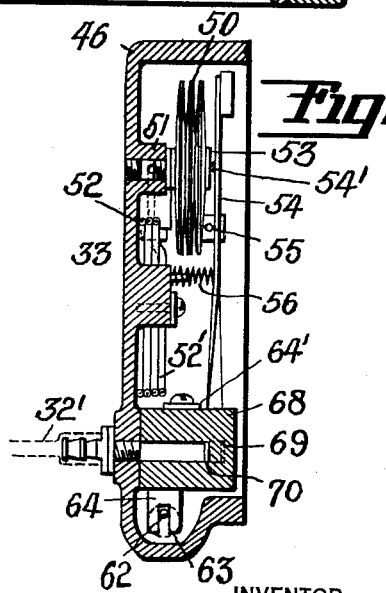
INVENTOR
Bert G. Carlson
BY
Herbert H. Thompson
HIS ATTORNEY.

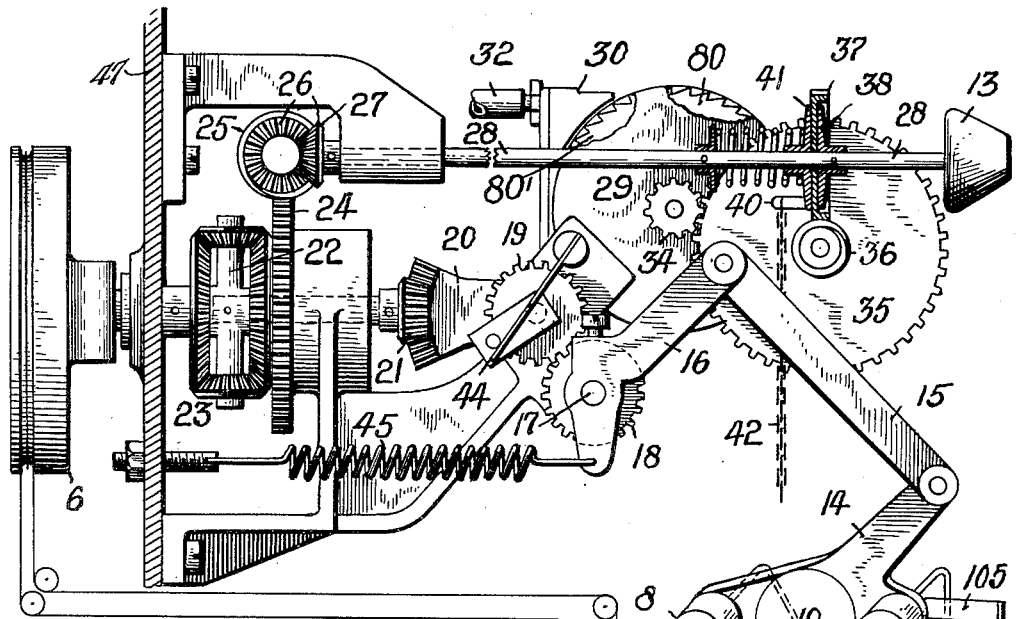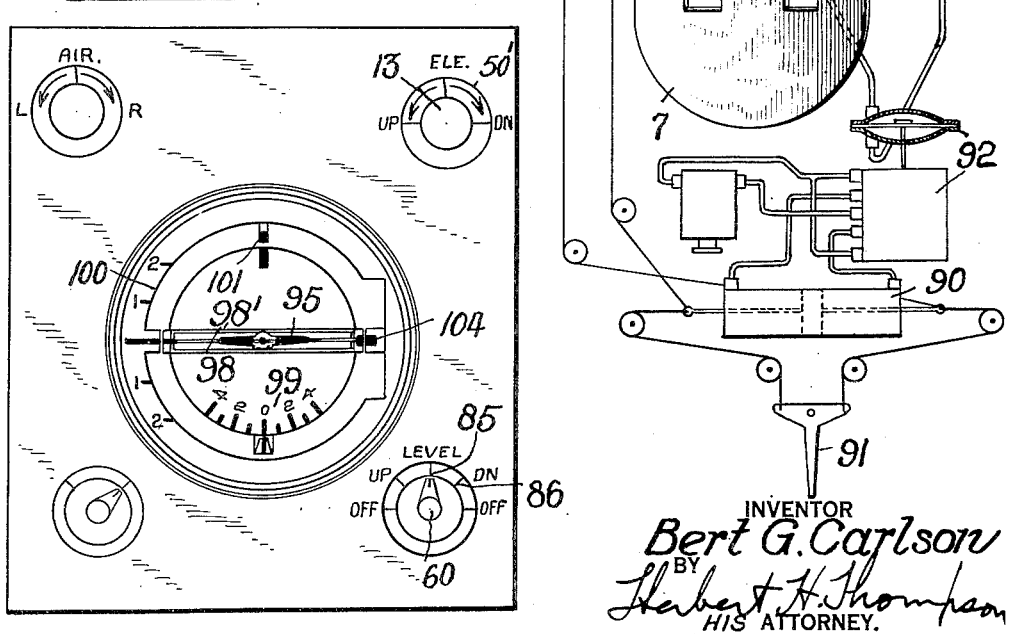

Patented Aug. 31, 1937

2,091,306

UNITED STATES PATENT OFFICE 2,091,306

LEVEL FLIGHT CONTROL FOR AUTOMATIC PILOTS

Bert G. Carlson, Freeport, N. Y., assignor to Sperry Gyroscope Company, Inc., Brooklyn, N. Y., a corporation of New York Application June 12, 1936, Serial No. 84,794
Renewed July 15, 1937

10 Claims. (Cl. 244—76)

This invention relates to automatic pilots for aircraft and, more particularly, to the automatic control of the flight in elevation so that the airplane may be caused to fly level or to ascend or descend at a predetermined rate through the automatic pilot. More specifically, my invention constitutes an improvement in the barometric means heretofore employed to operate in conjunction with the gyro or other pendulum, and in the method of operating the controls from the barometric means.

In the past it has been proposed to use either a true aneroid barometer as the barometric means, or a device of this character with a valve connection to the atmosphere so that the flexible container could be left open to the atmosphere until a predetermined height was reached, when it could be closed and used to maintain that height. See my prior application Serial No. 681,424, filed July 21, 1933, for Flight level control for automatic pilots.

According to my present invention, I prefer not to employ either of the above indicated forms of barometric means, but a device similar to a rate of climb or dive indicator, usually comprising a flexible container having a very restricted opening to the atmosphere so as to be responsive to rapid changes of altitude, but which equalizes the pressure inside of the same after being exposed for some time to a changed condition. This construction has a number of very important advantages which will appear from the following description, and also possesses the operating advantage that a small diaphragm may be used over a very wide range in altitude and at the same time sensitivity retained, because at no time is there a great difference of pressure within and without the container, so that there is much less danger of exploding the diaphragm than with either of the types of barometers heretofore employed.

Another improvement consists in the method of actuating the controls from the barometric means.

Referring to the drawings, showing one form my invention may assume,

Fig. 5 is a vertical sectional view, partly in elevation, of the control box and contents, shown in Fig. 1.

Fig. 6 is a side view of the barometer and its housing.

Fig. 7 is a detail of the barometer.

Fig. 8 is an elevation of a portion of the mechanism shown in Fig. 5, from the opposite side, parts being shown as an exploded perspective view and in diagram form.

Fig. 9 is a face view of the automatic pilot.

Figure 1:
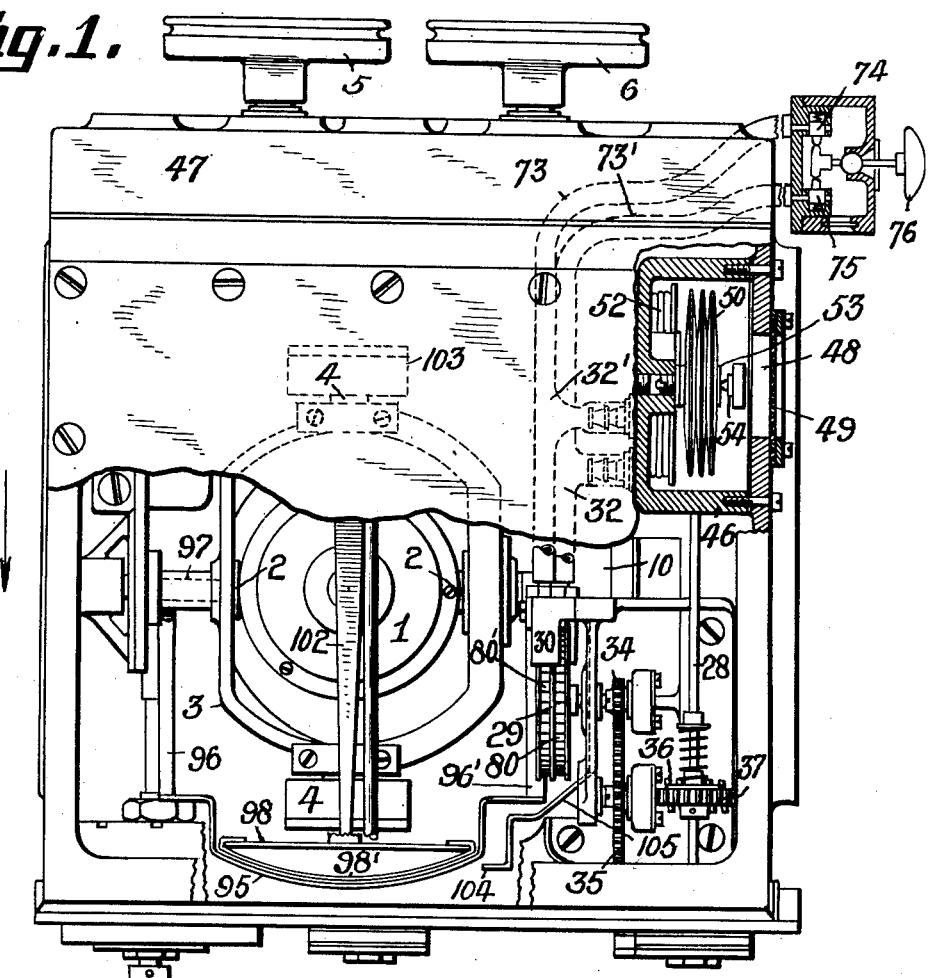
Fig. 1 is a plan view of the control box containing the elevation and lateral governing unit, with the cover broken away to show the important parts.

My invention is shown as applied to an automatic pilot of the general type shown in prior Patent #1,992,970, dated March 5, 1935, E. A. Sperry, Jr., M. F. Bates and applicant, inventors. In such gyro pilots, a form of gyro pendulum or base line 1 is usually used as the base line for controlling the attitude of the plane fore and aft and laterally, the gyroscope being mounted for oscillation about a transverse axis 2—2 within a gimbal ring 3 which, in turn, is mounted for oscillation about a fore and aft axis 4—4. The ailerons and elevators are controlled through some delicate controls about the two axes of the gyroscope, such as air pick-off devices, and the follow-up connections from the elevators and ailerons are brought back to the apparatus through the follow-up pulleys 5 and 6, respectively. It is the present practice to enclose the gyroscope and control parts in a closed casing 47, from which air is continuously exhausted through pipe 89.

The air pick-off means for elevator control may comprise a semicircular cut-off disc 7, secured to move with the gyroscope, and a pair of ports 8 and 9 pivoted on the aircraft on a pivot 10 in line with the transverse axis 2—2 of the gyroscope. The differential pressure drop in the pipes 11 and 12 leading to said ports is used to actuate the main servomotor 90 and elevator 91 through suitable relay valve 92. Normally, the position of said ports about axis 10 is governed from the follow-up pulley 6 and also by whatever hand adjustment 13 is provided on the pilot. I prefer to also bring in the barometric control differentially through these same connections so that the changes of elevation are made through the gyroscope.

As shown in Fig. 8, the bracket 14 supporting the ports 8 and 9 is adjusted about the axis 10 by means of a link 15 from an arm 16 which is secured to the shaft 17 of pinion 18, rotated from a second pinion 19. On the shaft of the latter is a short bevel gear sector 20 rotated from a bevel gear 21, turned from planetary arm 22 of a differential 23. One side of said differential is shown as turned from the follow-up pulley 6, while the other side is shown as turned from a worm gear 24 driven from a worm 25 on the shaft of bevel pinion 26, the latter driven from a bevel pinion 27 on a long shaft 28. Said shaft may be turned directly from the thumb piece 13 to cause the craft to climb or dive, but I also preferably connect the said shaft to a small motor controlled from the barometric means. Said motor is shown as a small, light, reversible air turbine 29 driven in either direction from air nozzles 30 and 31, connected to pipes 32 and 32' leading to the barometric means 33 (see Figs. 1 and 4). Said turbine is shown as comprising a pair of oppositely facing, bladed rotors 80, 80', one for each nozzle. The turbine is connected through reduction gearing 34 and 35 to drive a worm 36 (Fig. 8), turning a small worm wheel 37 loosely mounted on the shaft 28. A friction clutch 38 is preferably provided to couple said worm gear to the shaft so that the thumb piece 13 may be turned without turning the air motor and its reduction gearing.

Said clutch also permits limiting the climbing or diving angle that may be introduced by the barometric means, so that in case of disarrangement of the turbine mechanism, the airplane will not be put into a dangerous attitude. Said limiting means may comprise a small stud 40 secured to the driven portion 41 of the clutch 38, which stud is attached by a chain 42 to a stud 43 secured to a collar 82 on a shaft 60' so as to limit the angular movement of the clutch part 41 in either direction to the desired number of degrees. This results in limiting the movement of shaft 28 from the air turbine, since the added load stops the turbine, but leaves shaft 28 free to be turned from knob 13. It should be noted that the length of the gear 20 is also limited. This not only acts as a limit means, but prevents damage to the apparatus, since the pinion merely runs off the end of the short segment when turned too far and rotates no further, being held in this position by the leaf spring 44. The spring 45 is for the purpose of taking up lost motion in the gearing.

The barometric mechanism is shown as enclosed within a casing 46 which may be secured directly against the side wall of the outer case 47. Said casing, when so mounted, closes off the interior portion thereof from the interior of the case 47 so that the barometer will not be affected by the negative pressure within the latter, used for driving the gyroscope and actuating the turbines, etc. The interior of the casing 46 is shown as communicating directly with the outside atmosphere through an opening 48 in the outer case 47, with a screen 49 thereacross.

Figures 2, 3, 4:
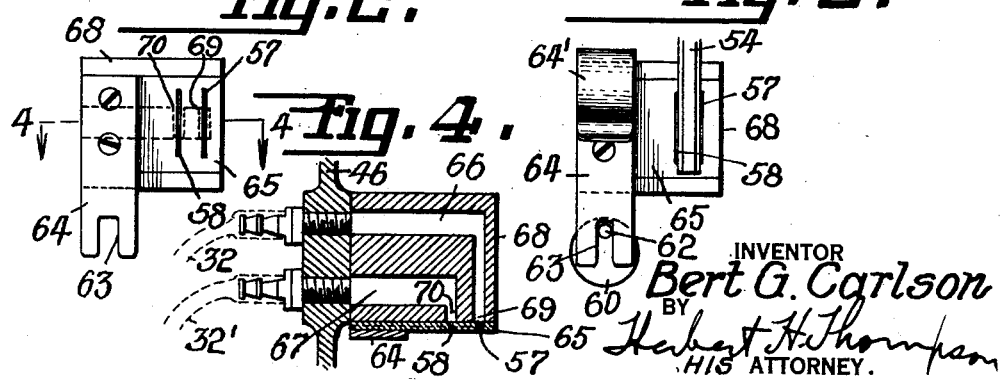
Fig. 2 is a detail of the part containing the air ports which are differentially affected by the barometer.
Fig. 3 is a similar view showing the lower portion of the blade or shutter actuated by the barometer.
Fig. 4 is a sectional view of the same on line 4—4 of Fig. 2.

The barometric device proper is shown as comprising a flexible container 50 mounted on a hollow boss 51 so that the top 53 of the container will move to the right and left in Figs. 1 and 6, as the air relative pressure within and without the container varies. The interior of the container is connected to the atmosphere preferably through a long capillary tube 52 which is shown as coiled around to form a coil 52' (Fig. 5), thereby permitting a slow leak to the atmosphere. On the top 53 of said container rests a small projection 54' on light blade or arm 54 which is pivoted at 55. A compression spring 56 may be provided to oppose the expansion of the container. The blade or arm 54 is shown as normally lying at its lower end between a pair of slots 57 and 58, which are connected to pipes 32 and 32' leading to the nozzles 30 and 31 at the air turbines. Since said nozzles lie within the casing 47, from which air is continuously withdrawn through pipe coupling 89, it will be evident that air jets will be discharged on the turbine, the relative strength of which will depend upon the relative amount of coverage of ports 57 and 58 by blade 54.

Preferably, means are provided to adjust the position of said ports 57 and 58 with respect to the blade. This may be accomplished from a level control knob 60 which may be turned in either direction against spring 61 to rotate a pin 62 eccentrically mounted on the inner end of the shaft 60' thereof. Said pin is shown as engaging the forked end 63 of a plate 64 secured to a thin plate 65 containing the aforesaid ports 57 and 58, the said plate 65 being slidably mounted for movement to the right and left in Figs. 2 to 4 and 6, under a light retaining spring finger 64'. The channels 66 and 67 in the base member 68, which lead from the ports 57 and 58 to the pipe connections 32 and 32', preferably terminate in slots 69 and 70, which are broader and also preferably shorter than the slots 57, 58, so that air will continue to be drawn in through said slots even though the plate 65 containing the same be moved a limited amount to the right or left, but further movement in either direction will close the ports or slots 69 and 70 entirely. The effect of an adjustment of these slots from their normal central position is first to cause a continuous climb of the plane at a rate dependent upon the amount of movement of the plate, when moved in one direction, or a continuous descent, as the case may be. This is due to the fact that the barometric means is a rate device and centralizes itself in a fixed position except when the atmospheric pressure is continuously changing. Hence, if the device is set so that the barometer normally assumes a position different than the position it assumes when the atmospheric pressure remains unchanged, the plane will continue to climb or descend as long as so set. This has a marked advantage over the prior barometric controls, which were not adapted to such uses.

Knob 60 is shown as provided with a pointer 85 readable upon markings on ring 86, showing "up" and "down" for limited movements to the right and left, respectively, and showing "off" for a 90° turn of the knob in either direction. In the "off" position, the plate 65 closes the ports 69 and 70 entirely. At the same time the stud 43 takes up all slack in the chain 42 so that the clutch member 41 is prevented from rotating in either direction and, therefore, the air tubine 29 rendered impotent.

If desired, the interior of the flexible container may be connected through coupling 71 to an insulated air flask 72, such as vacuum bottle in which the interior is kept at a constant temperature by having the space between the double walls thereof evacuated. This renders the same less sensitive to temperature changes of the air without. This also has the advantage of increasing the air capacity of the container so that the changes become relatively slower.

If desired, still another control may be brought into the device from a distance. This I have indicated in Fig. 1 by having branch pipes 73, 73' leading off from the pipes 32, 32' to manually controlled intake or by-pass valves 74 and 75 controlled by a handle 76. It is obvious that by relatively opening and closing said valves 74 and 75, the turbines 29 may be driven in either direction at will to cause ascent or descent.

The gyroscopic base line may also be used as an artificial horizon, as disclosed in the aforesaid Patent 1,992,970 and in the copending application of Sperry, Bates and applicant, Ser. No. 2,048, filed January 16, 1935. To this end, aircraft indicator 95, which is preferably in the form of a miniature airplane, is shown as secured for movement up and down in the opposite direction to the gyroscope by rods 96 and 96' connected to the rear side of a bail or loop 97 which moves with the gyroscope about a transverse axis, while horizon or reference lines 98' on disc 98 are connected to tilt with the gyro about a fore and aft axis. As explained in the aforesaid application, this results in the apparent movement of the aircraft indicator, being in the correct direction for both pitch and bank. Banking indications 99 may be provided on the disc 98 and pitch indications 100 on the bezel ring, to be read in connection with the vertical movements of the indicator 95. Preferably, also, the follow-up movements are shown on the same dial, the follow-up banking movements being indicated by index 101, connected by forwardly extending arm 102 to the follow-up port member 103 at the rear of the gyroscope. Similarly, an index 104 is connected by an arm 105 to the follow-up port member 14 on the transverse axis of the gyroscope. Since the member is moved also by the turbine 29 from the rate of climb indicator 50', the face of the instrument will show whether the craft is ascending or descending, even though it may be in the correct horizontal attitude, since under such circumstances the index 104 will be displaced with respect to the indicator bar 95.

The operation of my invention is briefly as follows: Normally, level flight is maintained through the gyro base line which controls the relative position of the cut-off plate 7 and ports 8 and 9. If, however, the plane, although level, is ascending or descending at a rate greater than, say, about 50 feet per minute, applicant's rate of climb device 50 will cause the turbine to be actuated to displace the controls of the gyroscope, causing horizontal flight to be resumed. If it is desired to ascend or descend at a uniform rate, the aviator turns the knob 60 to turn the pointer 85 to the proper indication up or down (see Fig. 9), thus displacing the plate 65 and causing ascent or descent, as desired, at a uniform rate until the knob 60 is turned back to the zero position.

In case it is desired to discontinue the barometric control, knob 60 is turned further to the "off" position in either direction, thus shutting off the air control to the turbine 29 and also preventing movement of the clutch member 41. Complete control through the automatic pilot may also be effected through the knob 13, which adjusts the controls 7 and 8 directly through shaft 28 regardless of the barometric control, which is made weak so as to be easily overpowered. Control may also be effected through knob 76, as explained.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

Having described my invention, what I claim and desire to secure by Letters Patent is:

1. In an automatic pilot for aircraft, the combination with a pendulum responsive device for maintaining the proper attitude in elevation, of supplemental means for maintaining level flight through said device comprising a rate of climb and descent device and a controller operated therefrom for altering the relation between said pendulum device and the craft upon change of altitude at a rate greater than a predetermined amount.

2. In an automatic pilot for aircraft, the combination with a pendulum responsive device for maintaining the proper attitude in elevation, of supplemental means for maintaining level flight through said device comprising a rate of climb and descent device, a two part controller operated therefrom adapted, under normal conditions, to maintain a substantially uniform altitude, and means for shifting the relation of the two parts of the controller to cause ascent or descent of the craft at predetermined rates.

3. In an automatic pilot for aircraft, the combination with a gyro base line having a controller for maintaining level flight, of a servomotor thereat for altering the controller to cause ascent or descent, a barometric means, a control device operated thereby for operating said servomotor in either direction, and alternative manual means for operating said servomotor in either direction.

4. In a barometric auxiliary control for automatic pilots having a pendulum responsive device for the primary control, a servomotor of limited power for altering the controls at said device, barometric means for actuating said motor, a slip friction clutch connecting said motor and controls, and means for limiting the movement of a portion of the clutch to such angles as to limit the climb and dive angles settable from said barometric means.

5. In a barometric auxiliary control for automatic pilots having a pendulum responsive device for the primary control, a servomotor of limited power for altering the controls at said device, barometric means for actuating said motor, direct manual means for altering said controls, a slip friction clutch connecting said motor and controls, and means for limiting the movement of a portion of the clutch to such angles as to limit the climb and dive angles settable from said barometric means, said limiting means being such as not to interfere with the said direct manual actuation of said controls.

6. In a control device for aircraft, the combination with an artificial horizon for controlling the elevator, of a flexible container closed to the atmosphere except for a capillary leak, a shutter connected to the movable side of said container so as to be moved as said container expands and contracts, an air port on each side of said shutter but out of contact therewith, a pair of oppositely acting air motors, one connected to each port, both motors being under the same negative pressure, whereby said motor is differentially driven in accordance with the coverage of said ports, and controls at the horizon, the relative position of which is altered by said motors.

7. An automatic pilot for aircraft as claimed in claim 6, in which said air ports are adjustable relative to said shutter, whereby the craft may be caused at will to ascend or descend at predetermined rates through the automatic pilot.

8. In a barometric auxiliary control for automatic pilots having a pendulum responsive device for the primary control, a servomotor for altering the controls at said device, barometric means for actuating said motor, and gearing connecting said motor and controls including a gear sector of limited length to limit the climbing or diving angle settable through said barometric device.

9. In an automatic pilot for aircraft, the combination with a gyroscopic artificial horizon for maintaining horizontal attitude, an indicating device connected thereto, simulating the relative movements of the craft and real horizon on pitching and rolling, a rate of climb and dive device for preventing substantial altitude changes, and a reference index on said indicator movable from said device.

10. An artificial horizon indicator for aircraft automatic pilots as claimed in claim 9, wherein the indicating device comprises a miniature representation of an aircraft connected to the gyroscope to move up and down with like up and down pitching of the craft, a horizon member connected to said gyroscope to tilt in the opposite direction of roll of the craft, said reference index being read in connection with both aircraft and horizon indicators.

BERT G. CARLSON.